United States Patent [19]

Mitome

[11] Patent Number: 4,845,754

[45] Date of Patent: Jul. 4, 1989

[54] POLE-ZERO ANALYZER

[75] Inventor: Yukio Mitome, Tokyo, Japan

[73] Assignee: NEC Corporation, Tokyo, Japan

[21] Appl. No.: 10,597

[22] Filed: Feb. 3, 1987

[30] Foreign Application Priority Data

Feb. 4, 1986 [JP] Japan .................................. 61-23140
Feb. 4, 1986 [JP] Japan .................................. 61-23141

[51] Int. Cl.[4] .............................................. G01L 1/00

[52] U.S. Cl. ........................................ 381/35; 381/51; 381/43

[58] Field of Search .............................. 381/35, 51–53, 381/43; 364/513.5

[56] References Cited

U.S. PATENT DOCUMENTS 4,163,120 7/1979 Baumwolspiner .................... 381/51
4,566,117 1/1986 Suckle .................................. 381/51

*Primary Examiner*—Bernard Roskoski
*Attorney, Agent, or Firm*—Sughrue, Mion, Zinn, Macpeak & Seas

[57] ABSTRACT

A pole-zero analyzer includes an autocorrelation impulse response calculator, first and second buffers, a pole parameter value table, a first coefficient calculator, a first inverse filter, a second coefficient calculator, a second inverse filter, a pole-zero calculator for calculating a pole parameter and a zero parameter in response to outputs from the first and second inverse filters and calculating an error value for determining the pole parameter, a buffer memory for generating an output from the pole parameter value table obtained when the error value satisfies predetermined conditions and predetermined portions of the zero parameter and the pole parameter calculated by the pole-zero calculator as outputs of the pole-zero analyzer, and a control circuit for controlling operation timings of the respective parts.

5 Claims, 4 Drawing Sheets

POLE-ZERO ANALYZER

BACKGROUND OF THE INVENTION

The present invention relates to a pole-zero analyzer and, more particularly, to a pole-zero analyzer for extracting pole-zero parameter values which approximate a spectrum of a signal such as a speech signal.

In the field of speech synthesis or speech recognition, it is important to extract parameter values which approximate a spectrum of speech. In addition, for a general signal, it is sometimes necessary to extract parameter values which approximate a spectrum of the signal.

As parameters which approximate a spectrum of a signal such as a speech signal (to be referred to simply as speech or the like hereinafter), pole or pole-zero is often used. This is because the pole or zero has a clear physical meaning and hence is advantageous in actual applications.

Conventionally, as a scheme of extracting pole parameter values which approximate a spectrum of speech or the like, a scheme is known in which an algebraic equation of higher order having linear prediction coefficients as coefficients is solved by a successive approximation such as a Newton-Raphson method. This first conventional example is described by J. D. Markel and A. H. Gray in the literature "Linear Prediction of Speech", chapter 7.

A second example of extracting pole parameter values, a scheme of performing inverse filtering in an autocorrelation region is described by Fushikida in an article "Formant Multistage Prediction Method Using Inverse Filtering in Autocorrelation" (Reference S81-41 of Speech Research of the Acoustical Society of Japan). In this second conventional example, when coefficients of a second-order pole circuit at the kth stage are $\alpha_{k,1}$ and $\alpha_{k,2}$ and an autocorrelation value of an input is $r_{k-1,i}$, an autocorrelation value of an output $r_{k,i}$ is obtained by the following equation (1):

$$r_{k,i} = (1 + \alpha_{k,1}^2 + \alpha_{k,2}^2)r_{k-1,i} - (\alpha_{k,1} - \alpha_{k,1}\,\alpha_{k,2})r_{k-1,i+1} - \alpha_{k,2}(r_{k-1,i-2} + r_{k-1,i+2}) \quad (1)$$

An autocorrelation of speech or the like is used as an input at the first stage and an output thereof is used as an input at the next stage, and autocorrelation values of outputs are successively obtained by the equation (1), thereby obtaining an autocorrelation value $r_{k,0}$ of an output of the final stage (Kth stage). This is a scheme called inverse filtering in an autocorrelation region. Note that $r_{k,0}$ is called the power of a predicted residual difference or error power, and 0th- to 2Kth-order autocorrelation values $r_{0,i}$ of input speech are required to calculate this.

A table of pole parameter values is prepared beforehand, and then coefficients $\alpha_{k,1}$, $\alpha_{k,2}$ at the respective stages are obtained to calculate the above-mentioned $r_{k,0}$. A value which gives a minimum $r_{k,0}$ among various candidates of pole parameter values is output as a pole parameter value which gives an optimal approximation.

On the other hand, an example (third example) of a scheme of extracting pole-zero parameter values is the one described by C. T. Mullis and R. A. Roverts in an article "The Use of Second-Order Information in the Approximation of Discrete-Time Linear Systems", printed in IEEE Transaction; ASSP - 24, No. 3, pp. 226 to 238.

This scheme approximates a spectral envelope H ($e^{j\omega}$) by a pole-zero representation having a transfer function represented by the following equation (2):

$$Q(e^{j\omega})/A(e^{j\omega}) = \sum_{k=0}^{m} q_k e^{-j\omega k} / \sum_{i=0}^{n} a_i e^{-j\omega i} \quad (2)$$

where $a_0=1$, n is the order of a denominator polynomial, i.e., the order of a pole circuit, and m is the order of a numerator polynomial, i.e., the order of a zero circuit.

This scheme is based on a principle in that $a_i$ and $q_k$ which minimize a value of the following equation (3) give an optimal approximation:

$$\begin{aligned} e &= (1/2\pi)\int_{-\pi}^{\pi} |H(e^{j\omega})A(e^{j\omega}) - Q(e^{j\omega})|^2 d\omega \\ &= \sum_{i=0}^{n}\sum_{l=0}^{n} a_i a_l r_{|i-l|} - 2\sum_{k=0}^{m}\sum_{i=0}^{n} q_k a_i h_{k-i} + \sum_{k=0}^{m} q_k^2 \end{aligned} \quad (3)$$

where $r_{|i-l|}$ is an autocorrelation value of an input signal of speech or the like and $h_i$ is an impulse response relating thereto.

At this time, an optimal parameter $a_i$ is obtained by solving the following simultaneous equations (4):

$$\sum_{i=0}^{n} a_i K_{i,l} = 0 \; (l = 1, \ldots, n) \quad (4)$$

where, $$K_{i,l} = r_{|i-l|} - \sum_{k=0}^{m-n+\min(i,l)} h_k h_{k+|i-l|} \quad (5)$$

An optimal parameter $q_k$ is given by the following equation (6) using a solution $a_i$ of the equation (4):

$$q_k = \sum_{i=0}^{n} a_i h_{k-i} \quad (6)$$

An autocorrelation value $r_{|i-l|}$ and an impulse response value $h_i$ can be easily obtained by a linear prediction method of higher orders than n or m, i.e., the first conventional scheme. In this case, not a root of the algebraic equation of higher order but a parameter $h_i$ need only be obtained.

In the third conventional example, coefficients $a_i$ and $q_k$ of denominator and numerator polynomials of the transfer function can be obtained. In order to obtain the pole-zero parameter value from this, a root of the algebraic equation of higher order (nth- or mth-order) must be obtained similar to the first conventional example.

In the above conventional examples, the first example, i.e., the one which solves the algebraic equation of higher order having linear prediction coefficients as coefficients has problems in that a large volume of calculations are required during solution of the algebraic equation of higher order or that it is difficult to stably obtain a frequency or a band width of the pole.

In the second example, although parameter values can be stably obtained since an optimal value is extracted beforehand from candidates expected to be suitable for pole parameters representing a spectrum of speech or the like, many calculations are required.

Furthermore, only pole parameter values can be obtained in the above two conventional examples. Therefore, depending on a shape of the spectrum of speech or the like, the parameter value of relatively low order cannot be the one which gives an optimal approximation. On the contrary, the parameter of higher order must be obtained in that case, resulting in a very large volume of calculations.

In the third conventional example, i.e., the one by Mullis and Roberts, the parameter value of relatively low order can be the one which gives the optimal approximation since the pole and zero parameters can be obtained. However, similar to the first example, the algebraic equation of higher order must be solved in the third example, and hence the same problem as that in the first example is posed. In this case, the number of zeros is small and hence is not a problem, but the order of poles is a problem because poles of 10th or higher orders are necessary.

SUMMARY OF THE INVENTION

It is an object of the present invention to provide a pole-zero analyzer capable of extracting pole-zero parameter values which approximate a spectrum of a signal such as a speech signal by a relatively few calculations.

A pole-zero analyzer of the present invention comprises means for calculating an autocorrelation value and an impulse response based on an input signal inside a time window, first and second buffer means for temporarily storing the calculated autocorrelation value and the impulse response value, a pole parameter value table for storing a pole parameter value and outputting the pole parameter value corresponding to a received code, first coefficient calculating means for calculating coefficients for performing inverse filtering in an autocorrelation region in response to an output from the pole parameter value table, first inverse filtering means for inversely filtering an output from the first buffer means in the autocorrelation region in response to an output from the first coefficient calculating means, second coefficient calculating means for calculating coefficients for performing inverse filtering in a time domain in response to an output from the pole parameter value table, a second inverse filtering means for inversely filtering an output from the second buffer means in the time domain in response to an output from the second coefficient calculating means, pole-zero calculating means for calculating a pole parameter and a zero parameter in response to outputs from the first and second inverse filtering means and calculating an error value for determining the pole parameter, means for generating, an output from the pole parameter value table obtained when the error value satisfies predetermined conditions and predetermined portions of the zero parameter and the pole parameter calculated by the pole-zero calculating means, as outputs of the pole-zero analyzer, and control means for controlling operation timings of the respective means.

DETAILED DESCRIPTION OF THE PREFERRED EMBODIMENTS

The present invention will now be described in detail with reference to the accompanying drawings.

Figure 1:
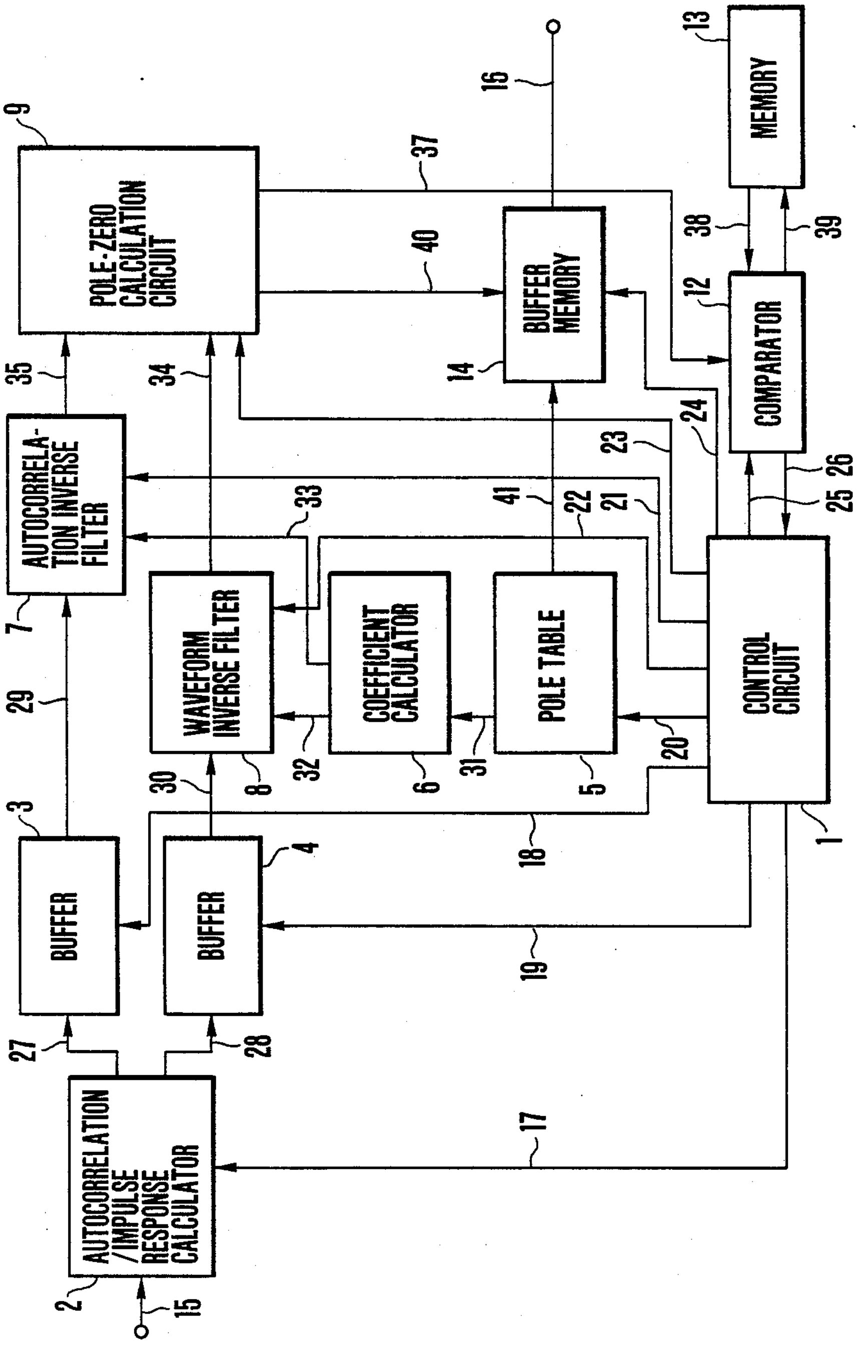
FIG. 1 is a block diagram of a circuit configuration according to an embodiment of the present invention.

FIG. 1 is a block diagram of an embodiment of a pole-zero analyzer of the present invention.

At every predetermined time of analyzing frame, initialization information is supplied from a control circuit 1 to an autocorrelation/impulse response calculator 2, buffers 3 and 4, an autocorrelation inverse filter 7, a waveform inverse filter 8, a pole-zero calculation circuit 9, a buffer memory 14, and a comparator 12 respectively through signal lines 17, 18, 19, 21, 22, 23, 24, and 25, thereby performing initialization.

In the autocorrelation/impulse response calculator 2, the beginning portions of autocorrelation coefficient values and an impulse response of a signal supplied from a signal line 15 are calculated and then supplied to the buffers 3 and 4 respectively through signal lines 27 and 28 in accordance with the instruction supplied from the control circuit 1. The number of samples of the impulse response required at that time is the same as the order of zero to be analyzed.

In the buffer 3, the contents are cleared in accordance with the initialization instruction from the control circuit 1, and then autocorrelation coefficients supplied from the autocorrelation/impulse response calculator 2 are stored. Thereafter, the autocorrelation coefficients stored therein are supplied to the autocorrelation inverse filter 7 through a signal line 29 whenever an output instruction is supplied from the control circuit 1.

Similarly, in the buffer 4, the contents are cleared in accordance with the initialization instruction from the control circuit 1, and then impulse response values supplied from the autocorrelation/impulse response calculator 2 are stored therein and supplied to the waveform inverse filter 8 through a signal line 30 whenever an instruction of supply is supplied from the control circuit 1.

A code of a candidate of the pole parameter value is supplied from the control circuit 1 to a pole table 5 through a signal line 20. A pole parameter value corresponding to the code is read out from the pole table 5 and supplied to a coefficient calculator 6 through a signal line 31. The coefficient calculator 6 calculates the coefficients for inverse filtering in an autocorrelation region, i.e., the coefficients in the parentheses of the above-mentioned equation (1) and supplies them to the autocorrelation inverse filter 7 through a signal line 33, and at the same time, calculates the coefficients for inverse filtering in a time domain, i.e., $\alpha_{k,1}$ and $\alpha_{k,2}$ in the equation (1) and supplies them to the waveform inverse filter 8 through a signal line 32. This process is repeated whenever a candidate of the pole parameter is supplied from the control circuit 1.

The autocorrelation inverse filter 7 inversely filters, in accordance with the instruction from the control circuit 1, the autocorrelation coefficient values supplied from the buffer 3 using the coefficient values supplied from the coefficient calculator 6. That is, by successively using the equation (1), autocorrelation coefficient values of zeroth-order for the output are calculated. The autocorrelation coefficient values thus calculated are supplied to the pole-zero calculation circuit 9. This process is also repeated whenever an instruction is supplied from the control circuit 1.

In response to an instruction from the control circuit 1, the waveform inverse filter 8 performs inverse filtering of the waveform of an impulse response supplied from the buffer 4 in the time domain using the coefficients supplied from the coefficient calculator 6.

The pole-zero calculation circuit 9 calculates a predetermined zero parameter and a pole parameter in accordance with the instruction from the control circuit 1 and based on the signal supplied from the waveform inverse filter 8 and supplies them to the buffer memory 14 through a signal line 40. The circuit 9 also obtains an error value for determining pole parameters and supplies it to the comparator 12.

In response to the instruction of initialization from the control circuit 1, the comparator 12 supplies an initial value of the above parameter for determination to a memory 13 through a signal line 39. Then, in accordance with the instruction from the control circuit 1, the comparator 12 compares the error value supplied from the pole-zero calculation circuit 9 with the value read out from the memory 13 through a signal line 38, and supplies the comparison result to the control circuit 1 through a signal line 26. When the error value is smaller, the contents of the memory 13 are updated to the error value. The process is repeated whenever an instruction is supplied from the control circuit 1.

When the comparison result supplied from the comparator 12 represents that the error value is smaller than the value read out from the memory 13, the control circuit 1 causes the pole table 5 to supply the pole parameter value at that time to the buffer memory 14 through a signal line 41, and causes the pole-zero calculation circuit 9 to supply the zero parameter value at that time to the buffer memory 14 through the signal line 40. The contents of the buffer memory 14 are updated to the values of the pole parameter value supplied from the pole table 5 and the pole-zero parameter value supplied from the pole-zero calculation circuit 9 whenever an instruction is supplied from the control circuit 1.

Candidates are selected from the pole parameter table, the respective coefficients for performing inverse filtering in the autocorrelation and the time domains are calculated, and inverse filtering is performed using these coefficients. An output instruction is supplied from the control circuit 1 at the end of the process of each analyzing frame, and the optimal parameter value is output from a signal line 16.

The above process is repeated at each analyzing frame.

Figure 2:
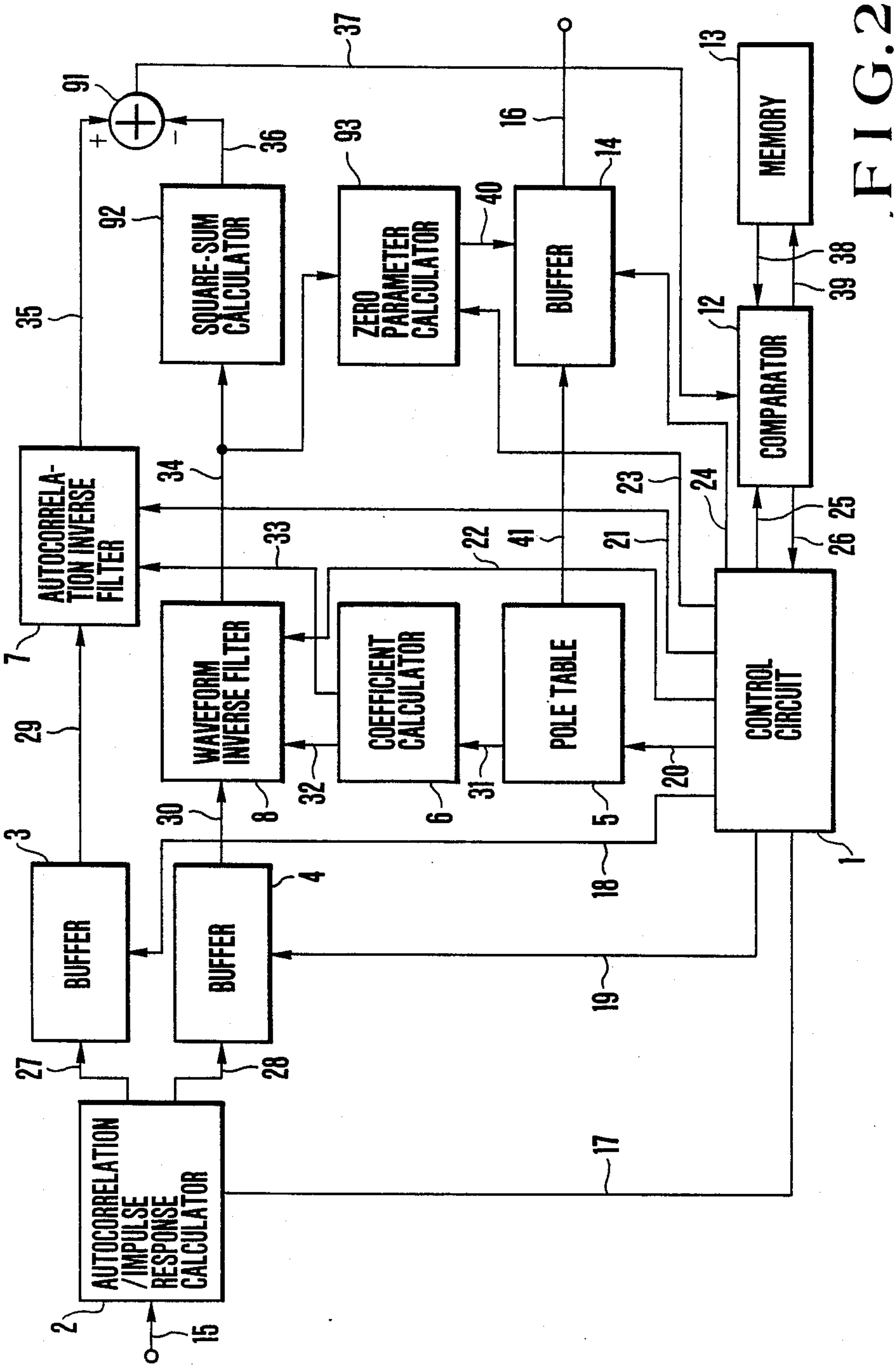
FIG. 2 is a block diagram of an embodiment of a pole-zero circuit in FIG. 1.

FIG. 2 is a block diagram of another embodiment of the pole-zero calculation circuit 9 in FIG. 1, and the same reference numerals as in FIG. 1 denote the same parts in FIG. 2. This embodiment is based on the following principle.

The equation (3) of the third conventional example described above can be rewritten as follows:

$$e = \sum_{i=0}^{n} \sum_{l=0}^{n} a_i a_l r_{|i-l|} - \sum_{k=0}^{n} u_k^2 \tag{7}$$

where, $$u_k = \sum_{i=0}^{n} a_i h_{k-i} \tag{8}$$

In order to minimize e, $a_i$ and $h_i$ which minimize the difference between the first and second terms may be obtained. The first term of the equation (7) can be obtained as an output of the autocorrelation inverse filter 7, and the equation (8) can be obtained as an output of the waveform inverse filter 8.

In FIG. 2, an output of the autocorrelation inverse filter 7 is supplied to a subtractor 91, and an output of the waveform inverse filter 8 is supplied to a square-sum calculator 92 and a zero parameter calculator 93. In the zero parameter calculator 93, when an instruction is supplied from the control circuit 1, the impulse response value which is inversely filtered and supplied from the waveform inverse filter 8 is converted into a zero parameter value and then supplied to the buffer memory 14 through the signal line 40. In the square-sum calculator 92, the square-sum of the inversely filtered impulse response value supplied from the waveform filter 8, i.e., the second term of the equation (8) is supplied to the subtractor 91 through a signal line 36. In the subtractor 91, the difference between the value supplied from the autocorrelation inverse filter 7 and the value supplied from the square-sum circuit 92, i.e., the error value e is calculated and supplied to the comparator 12 through a signal line 37.

In the comparator 12, when the instruction of initialization is supplied from the control circuit 1, the initial value for detecting the minimum value of the error value from the subtractor 91 is supplied to the memory 13 through the signal line 39. Then, in the comparator 12, in accordance with the instruction from the control circuit 1, the error value supplied from the subtractor 91 is compared with the value read out from the memory 13 through the signal line 38, and the comparison result is supplied to the control circuit 1 through the signal line 26. When the error value is smaller, the error value is supplied to the memory 13 to rewrite the contents thereof. The process is also repeated whenever an instruction is supplied from the control circuit 1.

When the comparison result supplied from the comparator 12 indicates that the error value from the subtractor 91 is smaller than the contents of the memory 13, the control circuit 1 causes the pole table 5 to supply the pole parameter value at that time to the buffer memory 14 through the signal line 41, and causes the zero parameter calculator 93 to supply the zero parameter value at that time through the signal line 40. Whenever the instruction is supplied from the control circuit 1, the contents of the buffer memory 14 are rewritten to the pole parameter value supplied from the pole table 5 and the zero parameter value supplied from the pole-zero calculation circuit 9 and stored.

Candidates are selected from the pole parameter table, the respective coefficients for performing inverse filtering in the autocorrelation and the time domains are calculated, and inverse filtering is performed using these coefficients. The output instruction is supplied from the control circuit 1 to the buffer memory 14 at the end of the process of each analyzing frame, and the optimal pole-zero parameter value is output from the signal line 16.

Figure 3:
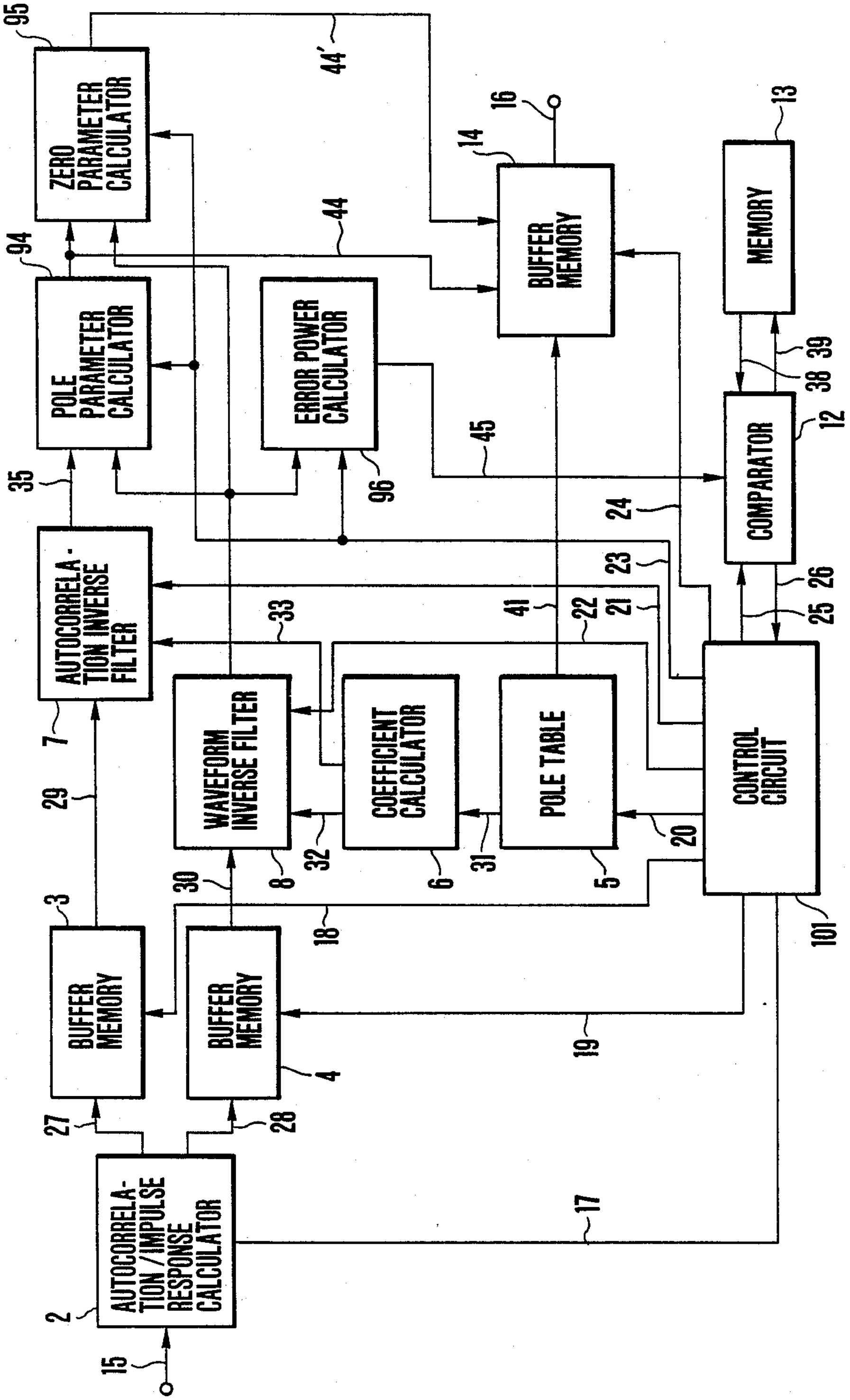
FIG. 3 is a block diagram of another embodiment of a pole-zero circuit in FIG. 1.

FIG. 3 is a block diagram of another embodiment of the present invention. The same reference numerals as in FIG. 1 denote the same parts in FIG. 3.

In this embodiment, the pole-zero representation system for approximating the spectrum is divided into a portion of fourth-order or less (to be referred to as Kth-order) and the remaining portion (Lth-order), and the method of the third conventional example is applied to the Kth-order portion. In the case of fourth-order or less, it is known that roots of a polynomial can be obtained by a finite number of calculations, so that a problem as that in the third conventional example is not posed. The portion corresponding to the Lth-order portion performs inverse filtering in the autocorrelation and the time domains. A difference between the second and third conventional examples is that inverse filtering is performed in the time domain to obtain zeros.

Candidates are selected from the pole parameter table, the respective coefficients for performing inverse filtering in the autocorrelation and the time domains are calculated, and inverse filtering is performed using these coefficients. The optimal value of the Kth-order pole-zero parameter and the error power are calculated by the method of the third conventional example for the respective inversely filtered outputs. Since this optimal value is the one only for the Kth-order portion and is not always optimal for the whole parameter, error powers are calculated for various candidates of pole parameters, and the minimum value thereof is detected. The value of the candidate of the pole parameter and the pole parameter obtained by the Kth-order portion at this time are the optimal pole parameter values. As for the zero parameter value, the one which is inversely filtered in the time region is further inversely filtered using the pole parameter obtained from the Kth-order portion to obtain the value which is equivalent to the equation (6).

The number of samples as a result of inverse filtering in the domain required for this embodiment is m, and the of calculations required for this is minimal.

In FIG. 3, the portion corresponding to the pole-zero circuit 9 in FIG. 1 consists of a pole parameter 94 which receives outputs from the autocorrelation filter 7 and the waveform inverse filter 8 calculates the fourth-order pole parameter, a zero calculator 95 which receives outputs from the parameter calculator 94 and the waveform inverse 8 and calculates the fourth-order zero parameter, error power calculator 96 which receives an out the waveform inverse filter 8 and calculates the power, and is operated by a control signal supplied a control circuit 101 through the signal line 23.

The circuits denoted by the same reference numerals as in FIG. 1 operate similarly to the ones described in the embodiment in FIG. 1.

The pole parameter calculator 94 calculates optimal fourth-order pole parameter value corresponding to the autocorrelation coefficient values of up to fourth-order supplied from the autocorrelation inverse filter 7 and the inversely filtered impulse response value supplied from the waveform inverse filter 8. At the same time, the error power calculator 96 calculates the error power at this time by the method of the third conventional example described above, and the error power is supplied to the comparator 12 through a signal line 45. The pole parameter output from the pole parameter calculator 94 and the output from the waveform inverse filter 8 are supplied to the zero parameter calculator 95. The output from the waveform inverse filter 8 is further inversely filtered using the fourth-order pole parameter to obtain the zero parameter.

In the comparator 12, when the instruction of initialization is supplied from the control circuit 101, an initial value for detecting the minimum value of the error power is supplied to the memory 13 through the signal line 38. Then, in the comparator 12, the error power value supplied from the error power calculator 96 is compared with the value read out from the memory 13 through the signal line 38 in accordance with the instruction from the control circuit 101, and the comparison result is supplied to the control circuit 101 through the signal line 26. When the error power value supplied from the error power calculator 96 is smaller, the error power value is supplied to the memory 13 to rewrite its contents. This process is repeated every time an instruction is supplied from the control circuit 101.

When the comparison result supplied from comparator 12 indicates that the error power value supplied from the error power calculator 96 is smaller than the value of the memory 13, the control circuit 101 causes the pole table 5 to supply the pole parameter value at that time to buffer memory 14 through the signal line 41, and at the same time, causes the pole parameter calculator 94 and the zero parameter calculator 95 to supply the fourth-order pole-zero parameter value to the buffer memory 14 through signal lines 44 and 44'. In the buffer memory 14, whenever an instruction is supplied from the control circuit 101, the contents are rewritten to the pole parameter value supplied from the pole table 5 and the pole-zero parameter value supplied from the pole and zero parameter calculators 94 and 95 and stored therein.

Thus, when various candidates of the pole parameter are inversely filtered, the optimal pole-zero parameter value is stored in the buffer memory 14. At the end of the process of each analyzing frame, the output instruction is supplied from the control circuit 101 to the buffer memory 14, and the optimal pole-zero parameter value is output from the signal line 16.

The above process is repeated at every analyzing frame.

It should be noted that in the above embodiment, the order of pole zero parameter values extracted at the pole and zero parameter calculators 94 and 95 is of fourth order, but it may be less than the fourth order.

Figure 4:
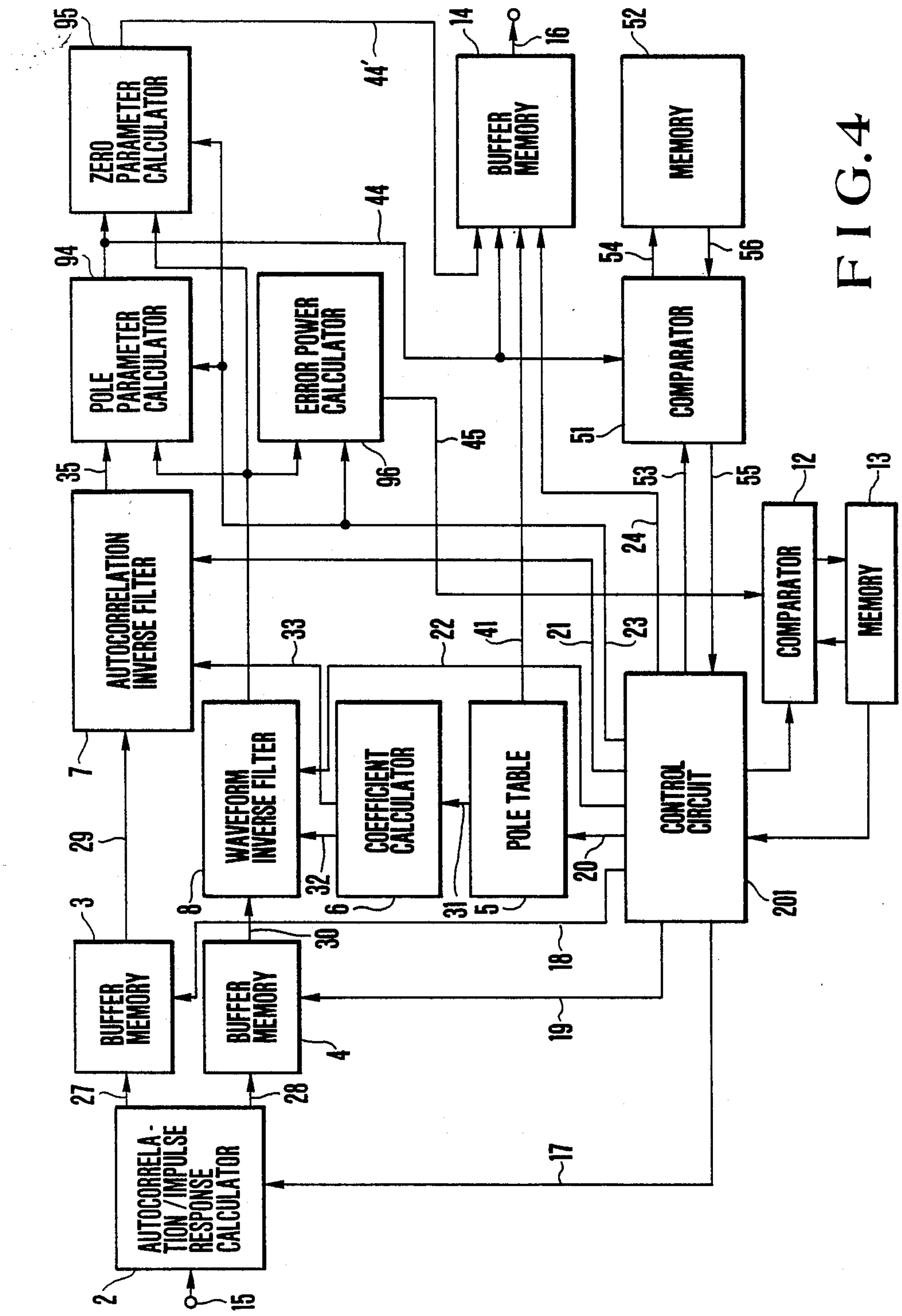
FIG. 4 is a block diagram of another embodiment of the present invention.

FIG. 4 is a block diagram of still another embodiment of the present embodiment. The same reference numerals as in FIG. 1 denote the same parts in FIG. 4.

In this embodiment, in order to extract the value corresponding to a speech synthesis model in pole-zero analysis for synthesizing speech, the pole parameter value can be limited. For this reason, a comparator 51 and a memory 52 are added to the embodiment in FIG. 3.

A difference between operations of the embodiments in FIGS. 3 and 4 will now be described below.

First, during initialization, a control circuit 201 supplies a limitation value for the pole parameter value to the comparator 51 through a signal line 53, and the comparator 51 supplies the value to the memory 52 through a signal line 54.

Every time a code of a candidate of the pole parameter corresponding to the limitation of the model is supplied to the pole table 5, the pole parameter calculator 94 supplies a fourth-order pole parameter value to the comparator 51. The comparator 51 determines whether the value corresponds to the value of limitation read out from the memory 52 through a signal line 56 and supplies the result to the control circuit 201 through a signal line 55.

The control circuit 201 refers the comparison result of the error power from the comparator 12 and extracts the optimal pole parameter value only when the determination result from the comparator 51 corresponds to the limitation.

In this embodiment, since only the pole parameter value corresponding to the limitation can be extracted, more stable formant extraction can be effectively performed in formant analysis of speech.

As has been described above, according to the embodiments of the present invention, a pole-zero parameter value which can approximate a spectrum more accurately can be effectively obtained more stably than the third conventional example by minimal calculations because algebraic equations of higher order need not be solved.

What is claimed is:

1. A pole-zero analyzer comprising means for calculating an autocorrelation value and an impulse response based on an input signal inside a time window; first and second buffer means for temporarily storing the calculated autocorrelation value and the impulse response value; a pole parameter value table for storing a pole parameter value and outputting the pole parameter value corresponding to a received code, first coefficient calculating means for calculating coefficients for performing inverse filtering in an autocorrelation region in response to an output from said pole parameter value table; first inverse filtering means for inversely filtering an output from said first buffer means in the autocorrelation region in response to an output from said first coefficient calculating means; second coefficient calculating means for calculating coefficients for performing inverse filtering in a time domain in response to an output from said pole parameter value table; second inverse filtering means for inversely filtering an output from said second buffer means in the time domain in response to an output from said second coefficient calculating means; pole-zero calculating means for calculating a pole parameter and a zero parameter in response to outputs from said first and second inverse filtering means and calculating an error value for determining the pole parameter; means for generating, an output from said pole parameter value table obtained when the error value satisfies predetermined conditions and predetermined portions of the zero parameter and the pole parameter calculated by said pole-zero calculating means, as outputs of said pole-zero analyzer; and control means for controlling operation timings of said respective means.

2. An analyzer according to claim 1, wherein the condition which said error value must satisfy is that said error value is minimum.

3. An analyzer according to claim 2, wherein said pole-zero calculating means includes means for obtaining a square sum of an output of said second inverse filtering means, means for obtaining a difference between an output from said first inverse filtering means and an output from said means for obtaining a square sum and outputting it as said error value, and means for calculating a zero in response to an output from said second inverse filtering means.

4. An analyzer according to claim 2, wherein said pole-zero calculating means includes means for calculating a pole parameter of fourth-order or less in response to outputs from said first and second inverse filtering means; means for calculating an error power of fourth-order or less in response to outputs from said first and second inverse filtering means and outputting the error power as said error value; and means for obtaining a zero parameter in response to an output from said first inverse filtering means and an output from said pole parameter calculating means.

5. An analyzer according to claim 4, further comprising means for checking whether an output from said pole parameter calculating means satisfies predetermined conditions, wherein said control means performs a pole parameter determining operation by said error value only when the output from said pole parameter calculating means satisfies said predetermined conditions.

* * * * *

UNITED STATES PATENT AND TRADEMARK OFFICE
CERTIFICATE OF CORRECTION

PATENT NO. : 4,845,754

DATED : July 4, 1989

INVENTOR(S) : Yukio Mitome

It is certified that error appears in the above-identified patent and that said Letters Patent is hereby corrected as shown below:

Column 7, line 35, after "autocorrelation" insert --inverse--.

Signed and Sealed this

Fourteenth Day of August, 1990

*Attest:*

HARRY F. MANBECK, JR.

*Attesting Officer*

*Commissioner of Patents and Trademarks*